United States Patent [19]

Breeding et al.

[11] Patent Number: 5,472,194
[45] Date of Patent: Dec. 5, 1995

[54] PROGRESSIVE GAMING APPARATUS

[75] Inventors: John G. Breeding, St. Louis Park; James Helgesen, Eden Prairie, both of Minn.

[73] Assignee: Shuffle Master, Inc., Eden Prairie, Minn.

[21] Appl. No.: 41,850

[22] Filed: Apr. 2, 1993

[51] Int. Cl.[6] .................................................. A63F 1/00
[52] U.S. Cl. ................ 273/138 A; 273/439; 273/85 CP; 273/292; 364/412
[58] Field of Search ........................... 273/138 A, 143 R, 273/85 CP, 439, 292; 364/410–412

[56] References Cited

U.S. PATENT DOCUMENTS

| | | | |
|---|---|---|---|
| 4,593,904 | 6/1986 | Graves | 273/138 A |
| 4,652,998 | 3/1987 | Koza et al. | 364/412 |
| 4,813,675 | 3/1989 | Greenwood | 273/138 A |
| 4,837,728 | 6/1989 | Barrie et al. | 364/412 |
| 4,842,276 | 6/1989 | Darby | 273/138 A |
| 4,861,041 | 8/1989 | Jones et al. | 273/292 |
| 4,882,473 | 11/1989 | Bergeron et al. | 235/280 |
| 4,906,005 | 3/1990 | Manabe | 273/138 A |
| 5,114,155 | 5/1992 | Tillery et al. | 273/138 A |
| 5,116,055 | 5/1992 | Tracy | 273/138 A |
| 5,248,142 | 9/1993 | Breeding | 273/138 R |
| 5,275,415 | 1/1994 | Wisted | 273/274 |

FOREIGN PATENT DOCUMENTS 0443420 8/1991 European Pat. Off. ........... 273/138 A

OTHER PUBLICATIONS

"Bar bosses see new trivia Game filling more seats" Smith, Cameron, *The Vancouver Sun* Wed. Feb. 21, 1990.

*Primary Examiner*—Vincent Millin
*Assistant Examiner*—Kerry Owens
*Attorney, Agent, or Firm*—Dorsey & Whitney

[57] ABSTRACT

An apparatus for a progressive jackpot game where multiple gaming tables at multiple facilities are electronically linked to allow players at the multiple tables to play for a progressive jackpot as well as a fixed payout. Betting and winning hand information is input at the gaming tables, and the information is sent over a network to a facility computer that sends the information to a central computer. Multiple facility computers are linked to the central computer by telephone lines. The central computer compiles all the betting and winning hand information and computes the progressive jackpot amount. The progressive jackpot amount is sent to the facility computers that control electronic displays boards for displaying the jackpot amount.

5 Claims, 4 Drawing Sheets

PROGRESSIVE GAMING APPARATUS

BACKGROUND OF THE INVENTION

The present invention generally relates to cardroom or video gaming involving a progressive jackpot. More particularly it relates to a progressive gaming apparatus that links a plurality of gaming tables, at a plurality of gaming facilities, to a single progressive jackpot.

Gaming facilities frequently provide a progressive jackpot component in connection with electronic or mechanical gaming devices, such as slot machines, video poker machines, and Keno machines. Generally, the progressive jackpot component is created by linking a plurality of machines to a single jackpot meter. As gaming tokens are placed in the machines by players, the jackpot amount increases and is displayed on the jackpot meter. A player on one of the plurality of linked machines wins the entire jackpot by obtaining a specified outcome, e.g., three 7's on the same row of a slot machine.

The progressive jackpot concept has also been applied to table or card games. U.S. Pat. No. 5,078,405 discloses a gaming table having a plurality of player positions. Each player position has a slot for receiving a gaming token that represents a bet on a progressive jackpot. The slot includes means for detecting the receipt of a gaming token. The token receipt information from each slot is sent to a display meter. A plurality of tables are linked to a single display meter displaying the progressive jackpot. Designated winning hands generate a fixed payout for players participating in the progressive game, e.g., a royal flush wins one hundred percent of the progressive jackpot.

However, placing tokens in a slot creates handling, inventory and accountability problems for the gaming facility. While the tokens are in the hopper under the slots, whether the hopper is at the gaming table or a central location in the gaming facility, these tokens cannot be used for wagering. Gaming facilities desire to keep the tokens in circulation, passing between players and dealers as fast as possible. Also, separate collection of the tokens requires further handling, security, and accounting for the tokens. It would be advantageous to keep the tokens from progressive gaming on the table, either in the player's control or collected by the dealer.

Also, it is recognized that the larger a game's jackpot, the greater the player interest is in playing that game. Therefore, it would be advantageous to link not only a plurality of gaming tables at one facility, but a plurality of gaming facilities in order to generate a larger, faster-growing progressive jackpot.

SUMMARY OF THE INVENTION

The apparatus of the present invention comprises betting selection inputs for each player at a gaming table. The token for the bet is placed on the table. The gaming table also includes a dealer control panel where information on player betting selections is collected and the dealer inputs winning outcome information. Multiple gaming tables at a facility are linked by a network to a facility computer that receives all of the betting and winning outcome information from the gaming tables on the network. Multiple facility computers are linked by telephone lines or other circuitry to a central computer. The central computer receives all of the betting and winning outcome information and computes a progressive jackpot amount. The progressive jackpot amount is sent to the facility computers. The facility computers are also linked to and control electronic display boards that display the progressive jackpot amount.

The progressive jackpot game is played independently at the various gaming tables. The betting and winning hand information is continuously being sent to the facility computers and then to the central computer, and the progressive jackpot amount is continuously being updated based on the betting and winning outcome information received by the central computer. The electronic display boards display the updated progressive jackpot amount as that information is received from the facility computers.

It is an object of the present invention to provide an improved progressive gaming apparatus whereby progressive gaming information is received, processed, and displayed electronically.

It is a further object of the present invention to provide an improved progressive gaming apparatus that links a plurality of gaming tables at a plurality of gaming facilities to a single progressive jackpot whereby the size of the jackpot generates substantial player interest.

It is a further object of the present invention to provide an improved progressive gaming apparatus that keeps gaming tokens in circulation.

It is a further object of the present invention to provide an improved progressive gaming apparatus that minimizes handling and accounting for gaming tokens.

DESCRIPTION OF THE PREFERRED EMBODIMENT

Figure 1:
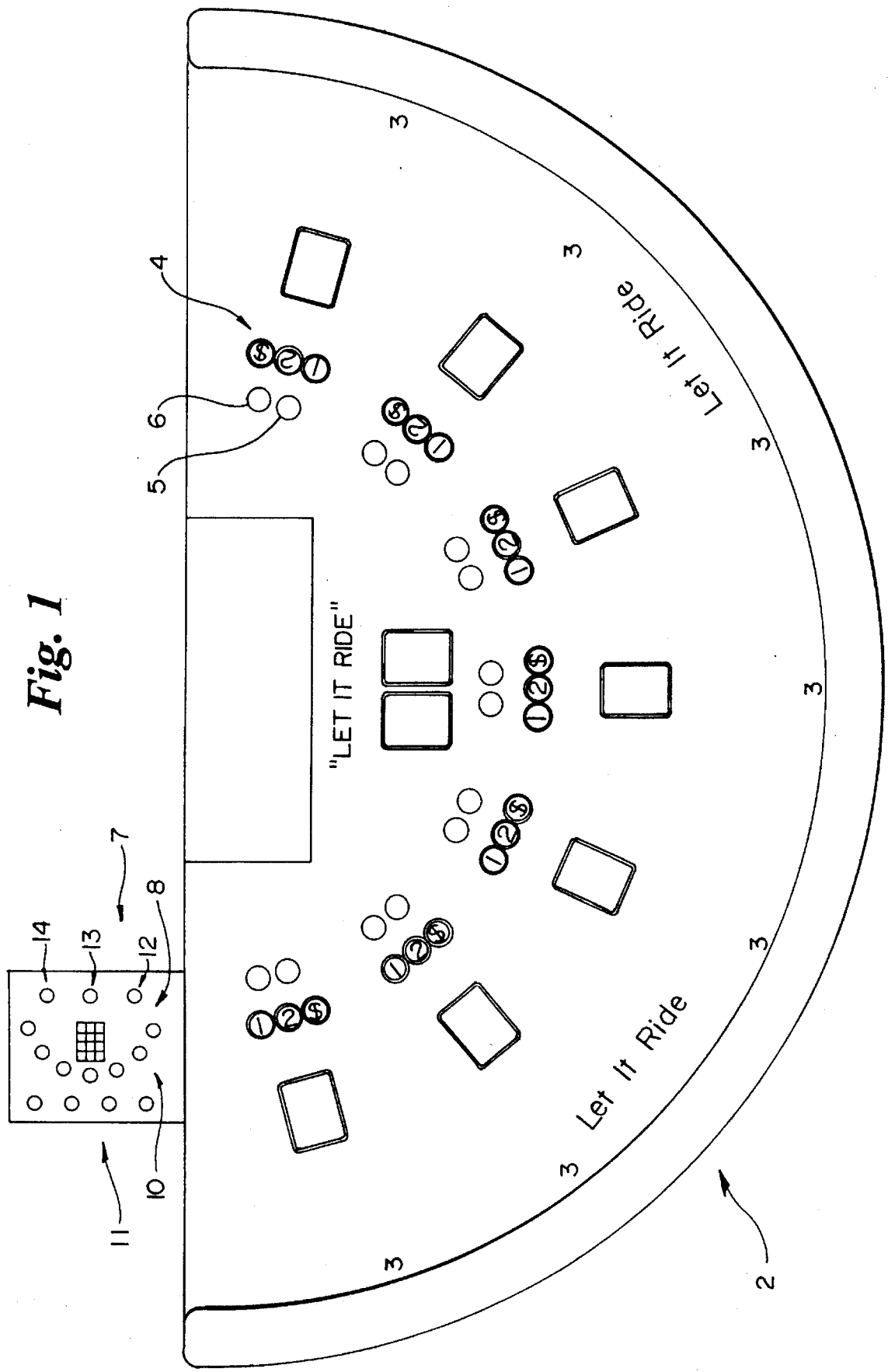
FIG. 1 shows a gaming table with the player selection inputs and dealer control panel of the present invention.

For this description of the preferred embodiment, the progressive gaming apparatus of the present invention is used in conjunction with a table card game known as "Let It Ride," as disclosed in U.S. patent application Ser. No. 08/023,196, filed Feb. 21, 1993, assigned to the assignee of the present invention, Shuffle Master, Inc., and incorporated by reference herein. However, the progressive gaming apparatus disclosed herein can be played alone or with other games, and the present invention is not limited to use with the game disclosed in this description of the preferred embodiment.

Generally, "Let It Ride" is played with a single, typical fifty-two card poker deck and broadly involves the generally well recognized and accepted set of rules, procedures and wager-resolving outcomes of five card poker. The game method comprises each player placing an initial, three-part wager to participate in the game. Cards are dealt by a dealer, three down to each player and two down to the dealer. Players inspect or "sweat" their cards, and the dealer asks "take it or leave it?" or "let it ride?" with regard to the first part of the initial bet. Players can choose to retrieve or remove from play the first part of their initial bet, or leave the first part in play or at risk, based on the value of the three cards in their hand. The dealer then turns over one of the dealer's cards and the dealer's query is repeated with regard to the second part of the initial bet. Players can choose to retrieve or remove from play the second part of their initial bet or leave the second part in play or at risk, based on the value of the four cards consisting of the three cards in the player's hand and the exposed dealer's card. Players have no option with the third part of the bet. Finally, all cards are shown and the payouts and collections are resolved according to the ranking of the poker hand of each player, i.e., the players are not playing against each other or the dealer.

More specifically, the initial wager placed by each player comprises three equal parts and is made or placed before any cards are dealt. Each player is dealt three cards face down in the customary fashion. Two common cards are dealt face down in front of the dealer for use by all of the players. Each player will use the two common cards in front of the dealer in combination with his or her three cards to create a five card hand. After all players have placed their bets and received and examined their cards, each is given the opportunity to retrieve one-third of the initial wager before the dealer reveals one of the two down cards previously placed in front of him. After all of the players have been queried and decided whether to "take it or leave it", the dealer turns one of the down cards face up. Each player now has the benefit of four cards, the three he or she is holding down plus the common card, and the dealer again gives each player the opportunity to retrieve one-third of the beginning wager before exposing the second common down card. After the second common down card is revealed, the players turn up the three cards they are holding thereby forming five card hands made up of the three cards dealt to each player and the two dealer cards. The dealer examines each of the players hands and determines what payout, if any, each player is entitled to receive according to that players' remaining wager and a preselected payout schedule. Payouts are made to players with winning hands and the losing wagers are collected. The cards are then reshuffled for the next hand.

In conjunction with the "Let It Ride" game, a two-part progressive game is played. In the first part of the progressive game, players win a fixed payout if they have one of a plurality of poker hands at the completion of the "Let It Ride" game. In the second part of the progressive game, players having a single, designated poker hand, e.g., a royal flush, qualify to play for the progressive jackpot that accumulates over a fixed period, e.g., at least one month. At the end of the fixed period, all qualifiers for the progressive jackpot play a single game, e.g., a single hand of five card poker. The player having the winning hand receives, for example, seventy-five percent of the progressive jackpot, and the remaining qualifiers receive an equal portion of the remaining twenty-five percent of the progressive jackpot. The progressive jackpot, fixed payout, and gaming facility take are generated from each progressive game bet. For example a representative allocation can be as follows: forty-five percent of the bet allocated to the progressive jackpot; forty percent of the bet allocated to the fixed payout; and fifteen percent of the bet allocated to the gaming facility and/or the gaming system for running the game.

Before a hand is dealt, each player at the table decides whether or not to participate in the progressive game. When all players at the table have made their betting decision, the progressive game and/or the related game is played. Multiple gaming tables within a facility are tied into the progressive game jackpot by the apparatus of the present invention. Further, multiple gaming facilities are tied into the progressive game jackpot by the apparatus of the present invention. The apparatus of the present invention compiles all of the betting data and computes the progressive jackpot amount, then displays the progressive jackpot amount on one or more display boards at the gaming facilities.

After the progressive betting is completed, the related game, in this case "Let It Ride," is played. At the completion of the "Let It Ride" game, each player has a five card poker hand. A player wins in the first part of the progressive game according to the following schedule of winning hands and payouts:

| Poker Hand | Payout |
|---|---|
| Royal Flush | $20,000 |
| Straight Flush | $2500 |
| Four of a Kind | $400 |
| Full House | $125 |
| Flush | $30 |

If any players at the table are winners according to the above schedule, the dealer inputs the winning hand and player table position information into the apparatus of the present invention. The apparatus calculates the progressive jackpot amount and sends this information to the display boards. A new progressive game and related game can now begin.

If a player has the single selected poker hand to qualify for the progressive jackpot, e.g., a royal flush, that player is paid according to the above schedule and is recorded by the facility as a qualifier for the progressive jackpot. At the end of the designated jackpot accumulation period, all of the qualifiers meet at a single location to play for the progressive jackpot.

The progressive game and related game, such as "Let It Ride," played at each table are played at a rate independent from the rate of play at other tables. The betting and winning hand information at each table is input into the apparatus of the present invention on a hand-by-hand basis as it is compiled at the table. The jackpot amount is periodically updated.

With reference to the Figures, a more detailed description of the apparatus of the present invention follows. As shown in FIG. 1, a playing table 2 has seven player positions 3. Each player position has a designated area 4 for playing a related game, e.g., "Let It Ride." Also, each player position has two progressive player operated game selection buttons 5, 6. If a player desires to place a bet in the progressive game, the player depresses the "IN" button 5 and places the required token on the table 2. If a player desires to stay out of the progressive game, the player depresses the "OUT" button 6. Prior to each hand of the progressive game, or related table game, each player at the table must select either the "IN" button 5 or the "OUT" button 6. In an alternative embodiment, each player position would have only one game selection button. Depressing this single button designates that the player is participating in the progressive game.

Also shown in FIG. 1 is the dealer control panel 7. The dealer control panel 7 includes four sets of inputs: the game status inputs 8; the keypad 9; the player position inputs 10; and the winning hand inputs 11. The game status inputs 8 allow the dealer to enter information on the status of the progressive game. The dealer depresses the "Betting Complete" button 12 when all players at the table have made their betting selections prior to the start of each game. At this time, the player betting information is sent to the facility computer 22.

When the game is over, the dealer depresses either the "Game Over" button 13 or the "Winner" button 14. Selection of the "Game Over" button 13 resets the player selection buttons 5, 6 at each player position and betting for a new game is initiated. The dealer selects the "Winner" button 14 when one or more players participating in the progressive game have one of the winning hands. Next, a security code is entered on the keypad 9. For lower payout winners, the dealer will have a unique security code to enter. For the highest payout hands, the pit boss or shift manager will have a different unique security code. Therefore, one of these supervisory managers confirms the high payout hand before the information is entered and the payout is made. For example, the two different security codes are four-digit codes distributed daily.

Next, the dealer inputs the player position of the winning hand by selecting the corresponding player position input 10 for the winning player. Finally, the dealer inputs the winning hand by selecting the appropriate winning hand input 11.

In an alternative embodiment, the keypad 9 also is used to activate or disable the progressive gaming inputs 5, 6, 8, 10, 11 at a table. A specific four-digit code disables all of the progressive game inputs at the gaming table and another four-digit code activates the progressive gaming inputs at a table.

Figure 2:
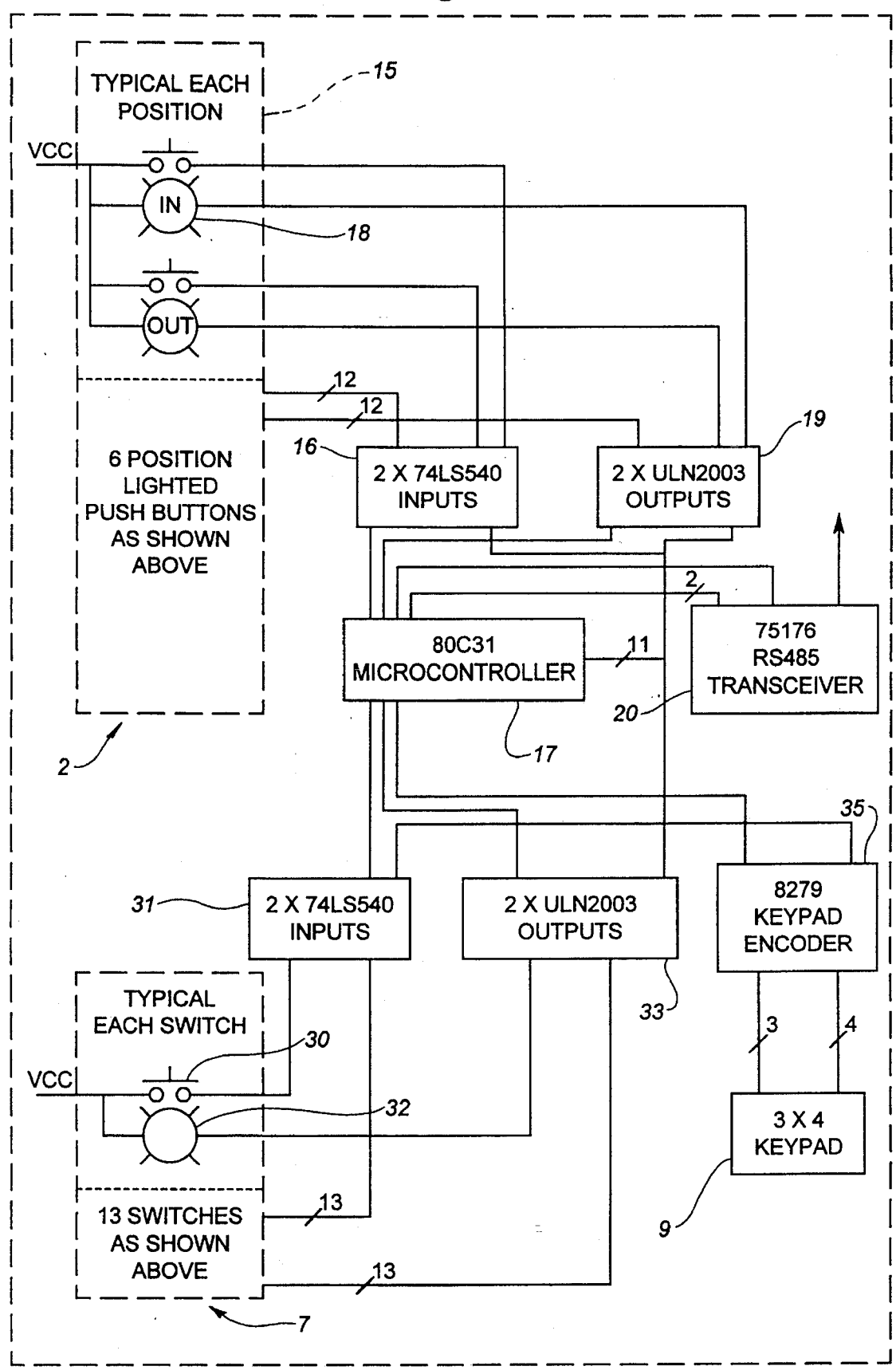
FIG. 2 shows a schematic diagram of the player selection inputs and dealer control panel.

FIG. 2 shows the player input and dealer control panel circuitry. Each selection button 5, 6 includes a pressure-sensitive actuating switch 15 that is connected through an input device 16 to a microcontroller 17. An example of input device 16 is an Inverting Octal Tri-state Buffer, available from National Semiconductor, Santa Clara, Calif. 95051. The microcontroller may be selected from a variety of commercially available microcontrollers such as the 80C31 microcontroller, available from Intel Corporation, Santa Clara, Calif. When a player depresses actuating switch 15, the microcontroller 17 turns on the button light 18 through output device 19 signalling to the player and dealer that the player has selected whether or not to place a bet on the progressive game for the upcoming hand. An example of output device 19 is a Darlington Array, available from Allegro Microsystems Inc., Worcester, Mass. 01615. Microcontroller 17 is programmed so that once a player has actuated one of the selection buttons 5, 6, actuation of the other selection button will not be acknowledged or recorded.

When all of the players at a table have made their betting selection, the dealer depresses "Betting Complete" button 12 on the dealer control panel 7. The encoded betting information is sent from the microcontroller 17 to an RS485 transceiver 20 and, referring to FIG. 3, the encoded betting information is sent over network 21 to the facility computer 22. The facility computer 22 can be one of numerous commercially available personal computers generally having a monitor, microprocessor, information storage, and I/O ports, for example, an IBM PS/1, available from IBM, Armonk, N.Y.

Figure 3:
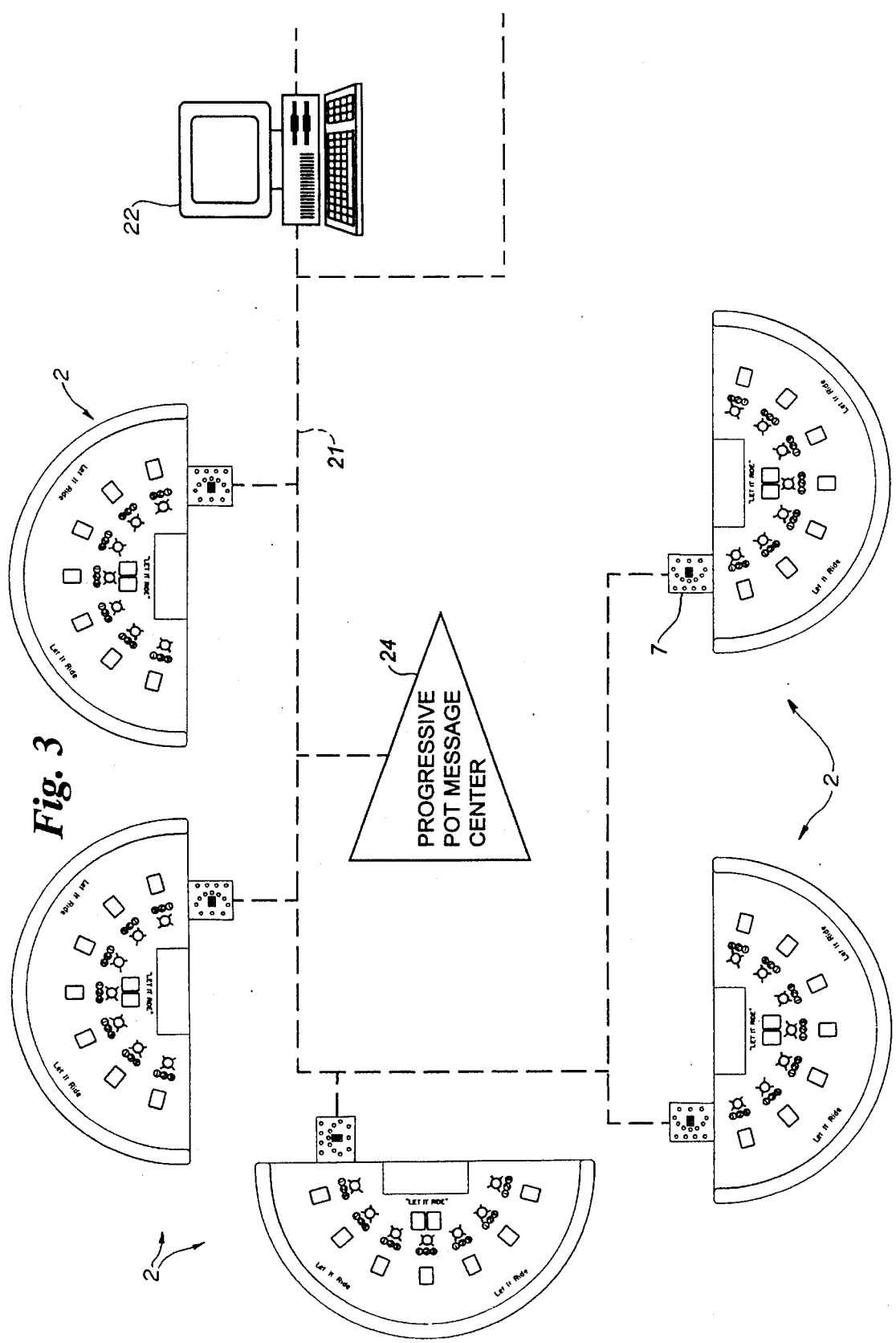
FIG. 3 shows gaming tables connected to a facility computer by a network of the present invention.

As shown in FIG. 3, the facility computer 22 receives betting and winning hand information from all of the tables 2 connected to the network 21. Generally, a maximum of thirty-two devices can be connected to the facility computer 22 via the RS485 interface network. Therefore, a facility having more than thirty-two gaming tables equipped for progressive gaming will have more than one facility computer.

Figure 4:
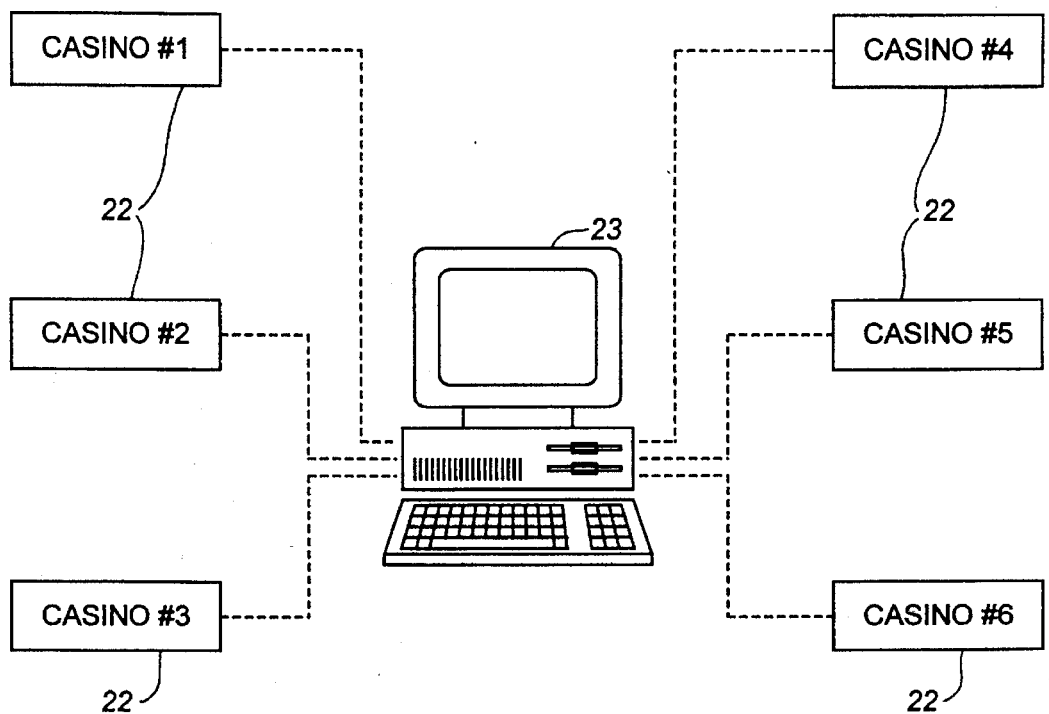
FIG. 4 shows a plurality of facility computers linked to the central computer of the present invention.

As shown in FIG. 4, the facility computers 22 are electronically linked to a central computer 23 by telephone lines of other circuitry well known to one of ordinary skill in the art. The central computer 23 may be located at a site separate from all of the facility computers 22 or co-located at one of the gaming facilities. The central computer may also be one of the generally available personal computers such as the IBM PS/1 available from IBM. In an alternative embodiment of the invention, one of the facility computers 22 acts as both the facility computer 22 for a gaming facility and as the central computer 23.

The central computer 23 receives all of the betting and winning hand information from the facility computers 22 and computes the progressive jackpot amount. The central computer 23 receives the number of bets and number and type of winners from each progressive gaming table 2. A unique address identifies each progressive table at each gaming facility. The central computer includes a data base and associated accounting software. The data base allows the central computer to compare the number of actual payoffs to the anticipated number of payoffs to detect any cheating or other irregularities at any of the tables or facilities. The central computer can generate a variety of accounting reports on each table or gaming facility on a daily basis. The progressive jackpot amount is computed each time new betting or winning hand information is received and the new jackpot amount is sent to the facility computers 22 as soon as practicable, but at least every five minutes.

Figure 5:
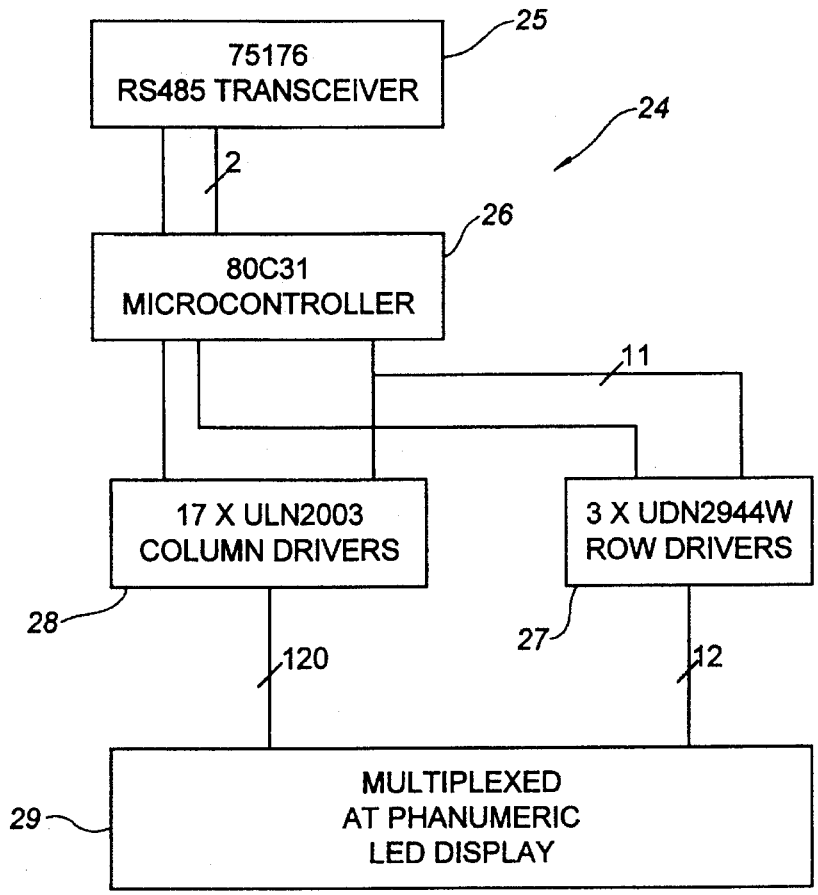
FIG. 5 shows a schematic diagram of the display board of the present invention.

As shown in FIG. 3, the facility computer 22 is also connected by the RS485 network to a display center 24. As shown in FIG. 5, the display center includes an RS485 transceiver 25 connected to a microcontroller 26 which is the same type as used in the dealer control panel shown in FIG. 2. The facility computer 22 sends the jackpot amount over the network 21 to the display board microcontroller 26. The display board microcontroller 26 drives row drivers 27 and column drivers 28 to display the jackpot amount on a typical alphanumeric LED display 29. Column drivers 28 can be the same device as output devices 19 and 33, e.g., a Darlington Array, available from Allegro Microsystems Inc., Worcester, Mass. 01615. Row drivers 27 can be a Quad High-Current High-Voltage Source Driver, available from Allegro Microsystems Inc., Worcester, Mass. 01615.

As shown in FIG. 2, the game status inputs 8, player position inputs 10, and winning hand inputs 11 are similar to the player selection inputs 5, 6. Each of the sets of inputs 8, 10, 11 has a pressure-sensitive actuating switch 30 multiplexed through an input device 31 to microcontroller 17. Microcontroller 17 turns on input light 32 through output device 33 to show that the input has been selected. Input device 31 is the same as input device 17 and output device 33 is the same as output device 19.

At the end of the table game, e.g., "Let It Ride," the dealer determines whether there are any progressive game winners. For each winner the dealer selects the "Winner" button 12 on the dealer control panel 7. If the winning hand is one of the high payout hands, e.g., royal flush or straight flush, the dealer notifies either the pit boss or shift manager who confirms the winning hand and enters a security code on the keypad 9. Keypad 9 is selected from commercially available 3×4 keypads and is connected to microcontroller 17 by keypad encoder 35, e.g., Model 8279, available from Intel Corporation, Santa Clara, Calif. The dealer then depresses the player position input 10 corresponding to the player having a winning hand. Next, the dealer depresses the particular winning hand input 11, e.g. royal flush, straight flush, four of a kind, or full house. After all winning hand entries have been made, or if there were no winners for the hand, the dealer selects the "Game Over" button 13 and the next game can be initiated.

The present invention may be embodied in other specific forms without departing from the essential attributes thereof.

It is desired that the embodiments described above be considered in all respects as illustrative, not restrictive, reference being made to the appended claims to indicate the scope of the invention.

What is claimed as new and desired to be protected by Letters Patent is:

1. Apparatus for a progressive jackpot game comprising:

(a) a plurality of gaming tables, each table having a plurality of player positions;

(b) selection means at each player position utilizing a pressure sensitive apparatus for placing a bet on the progressive jackpot game, wherein the selection means includes two inputs, a first input designating that the player is participating in the progressive jackpot game and a second input designating that the player is not participating in the progressive game;

(c) dealer control means at each table for accumulating the progressive betting information from each selection means and for entering data on winning outcomes in the progressive jackpot game, wherein the dealer control means includes a means for entering a security code prior to entering data on winning outcomes, a plurality of inputs, each input designating one of a plurality of winning outcomes and one of the plurality of player positions at a gaming table of the progressive jackpot game; and (d) computer means operably connected to each dealer control means for continuously accumulating the progressive betting information and winning outcome data, calculating a progressive jackpot amount, and controlling a display means operably connected to the computer means for displaying the progressive jackpot amount.

2. The apparatus of claim 1, wherein the plurality of gaming tables are located at different gaming facilities.

3. The apparatus of claim 2, wherein the computer means includes a plurality of facility computers, each facility computer operably connected to a plurality of gaming tables, and a central computer operably connected to the plurality of facility computers.

4. The apparatus of claim 1, wherein the dealer control means, computer means, and display means are operably connected to each other by a local network.

5. The apparatus of claim 4, wherein the display means includes an alphanumeric LED display.

* * * * *